(12) United States Patent
Roberts

(10) Patent No.: US 9,401,957 B2
(45) Date of Patent: Jul. 26, 2016

(54) SYSTEM AND METHOD FOR SYNCHRONIZATION BETWEEN SERVERS

(75) Inventor: Andrew Fiske Roberts, Melrose, MA (US)

(73) Assignee: International Business Machines Corporation, Armonk, NY (US)

( * ) Notice: Subject to any disclaimer, the term of this patent is extended or adjusted under 35 U.S.C. 154(b) by 1114 days.

(21) Appl. No.: 11/855,647

(22) Filed: Sep. 14, 2007

(65) Prior Publication Data

US 2009/0077262 A1    Mar. 19, 2009

(51) Int. Cl.
| | |
|---|---|
| G06F 15/16 | (2006.01) |
| G06F 7/00 | (2006.01) |
| G06F 17/00 | (2006.01) |
| H04L 29/08 | (2006.01) |
| G06F 11/16 | (2006.01) |
| G06F 17/30 | (2006.01) |

(52) U.S. Cl.
CPC ........ *H04L 67/1095* (2013.01); *G06F 11/1662* (2013.01); *G06F 17/30578* (2013.01)

(58) Field of Classification Search
CPC ............ H04L 67/1095; G06F 11/1662; G06F 17/30578
USPC ................... 709/221, 248, 250; 707/203, 611
See application file for complete search history.

(56) References Cited

U.S. PATENT DOCUMENTS

| | | | |
|---|---|---|---|
| 5,684,990 A | 11/1997 | Boothby | |
| 5,706,509 A | 1/1998 | Man-Hak Tso | |
| 5,710,922 A | 1/1998 | Alley et al. | |
| 5,727,202 A | 3/1998 | Kucala | |
| 5,742,820 A | 4/1998 | Perlman et al. | |
| 5,761,439 A | 6/1998 | Kar et al. | |
| 5,819,272 A | * | 10/1998 | Benson |
| 5,832,489 A | 11/1998 | Kucala | |
| 5,870,765 A | 2/1999 | Bauer et al. | |
| 5,878,434 A | * | 3/1999 | Draper et al. |
| 5,884,323 A | 3/1999 | Hawkins et al. | |

(Continued)

OTHER PUBLICATIONS

Examination Report received in European Application No. 08 877 208.2-1852, dated Oct. 10, 2013, pp. 1-11.

(Continued)

*Primary Examiner* — Philip Chea
*Assistant Examiner* — Wing Ma
(74) *Attorney, Agent, or Firm* — Brian J. Colandreo, Esq.; Jeffrey T. Placker, Esq.; Holland & Knight LLP

(57) ABSTRACT

A system and method for synchronizing data between two or more servers including replicating at least a portion of an original data set, associated with a first server, to provide a replicated data set, associated with a second server, the replicated data set based upon, at least in part, the original data set. One or more second-server commands executed on the replicated data set by the second server are stored. One or more first-server commands to be executed on the original data set by the first server, are provided in which the one or more first-server commands are based upon, at least in part, the one or more second-server commands. One or more first-server output objects, returned by the first server in response to the one or more first-server commands, are compared to one or more second-server output objects, returned by the second server in response to the one or more second-server commands. An identity of one or more first-server output objects is mapped to an identity of the one or more second-server output objects.

18 Claims, 12 Drawing Sheets

(56) References Cited

U.S. PATENT DOCUMENTS

| | | | |
|---|---|---|---|
| 5,884,325 A | 3/1999 | Bauer et al. | |
| 5,926,816 A | 7/1999 | Bauer et al. | |
| 5,970,502 A * | 10/1999 | Salkewicz et al. | |
| 5,991,771 A * | 11/1999 | Falls et al. | |
| 6,000,000 A | 12/1999 | Hawkins et al. | |
| 6,044,381 A | 3/2000 | Boothby et al. | |
| 6,052,735 A | 4/2000 | Ulrich et al. | |
| 6,067,551 A | 5/2000 | Brown et al. | |
| 6,088,706 A * | 7/2000 | Hild | |
| 6,125,369 A | 9/2000 | Wu et al. | |
| 6,131,096 A | 10/2000 | Ng et al. | |
| 6,151,606 A | 11/2000 | Mendez | |
| 6,192,365 B1 * | 2/2001 | Draper et al. | 707/648 |
| 6,223,187 B1 | 4/2001 | Boothby et al. | |
| 6,256,634 B1 * | 7/2001 | Moshaiov et al. | |
| 6,295,541 B1 | 9/2001 | Bodnar et al. | |
| 6,363,401 B2 * | 3/2002 | Yahya et al. | |
| 6,393,419 B1 * | 5/2002 | Novak et al. | |
| 6,393,434 B1 * | 5/2002 | Huang et al. | |
| 6,446,075 B1 * | 9/2002 | Velasco | 707/610 |
| 6,487,560 B1 | 11/2002 | LaRue et al. | |
| 6,516,327 B1 * | 2/2003 | Zondervan et al. | |
| 6,581,075 B1 | 6/2003 | Guturu et al. | |
| 6,594,664 B1 | 7/2003 | Estrada et al. | |
| 6,615,223 B1 * | 9/2003 | Shih et al. | |
| 6,643,670 B2 * | 11/2003 | Parham et al. | |
| 6,711,578 B1 * | 3/2004 | McCaw et al. | |
| 6,910,053 B1 * | 6/2005 | Pauly et al. | |
| 7,024,428 B1 | 4/2006 | Huang et al. | |
| 7,024,430 B1 * | 4/2006 | Ingraham et al. | |
| 7,127,509 B2 * | 10/2006 | Wu | 709/224 |
| 7,143,419 B2 | 11/2006 | Fischer et al. | |
| 7,231,391 B2 * | 6/2007 | Aronoff et al. | |
| 7,281,024 B1 * | 10/2007 | Banerjee et al. | |
| 7,441,011 B2 * | 10/2008 | Lin | G06F 12/0866 707/E17.12 |
| 7,444,333 B2 * | 10/2008 | Jacobs et al. | |
| 7,490,096 B2 * | 2/2009 | Perrin et al. | |
| 7,516,167 B2 * | 4/2009 | Selman et al. | |
| 7,526,576 B2 * | 4/2009 | Bank et al. | 709/248 |
| 7,533,134 B2 * | 5/2009 | Terry et al. | |
| 7,769,722 B1 * | 8/2010 | Bergant et al. | 707/681 |
| 8,166,101 B2 * | 4/2012 | Shah | G06F 17/30595 709/203 |
| 8,510,404 B2 * | 8/2013 | Carmel | H04L 67/104 707/622 |
| 2002/0059279 A1 * | 5/2002 | Kim et al. | 707/100 |
| 2002/0133508 A1 * | 9/2002 | LaRue et al. | 707/202 |
| 2002/0138483 A1 * | 9/2002 | Bretl et al. | 707/8 |
| 2004/0025072 A1 * | 2/2004 | Mau | 713/400 |
| 2004/0034668 A1 * | 2/2004 | Gotz et al. | 707/201 |
| 2004/0098425 A1 * | 5/2004 | Wiss et al. | 707/204 |
| 2004/0153576 A1 * | 8/2004 | Hansmann et al. | 709/248 |
| 2005/0055382 A1 * | 3/2005 | Ferrat | G06F 17/30575 |
| 2005/0071389 A1 | 3/2005 | Gupta | |
| 2005/0165884 A1 | 7/2005 | Masek | |
| 2005/0223047 A1 * | 10/2005 | Shah | G06F 17/30575 |
| 2006/0095447 A1 * | 5/2006 | Dickinson | G06F 17/246 |
| 2006/0136686 A1 | 6/2006 | Cherkauer et al. | |
| 2006/0242444 A1 * | 10/2006 | Novik | G06F 17/30215 713/400 |
| 2007/0136389 A1 * | 6/2007 | Bergant et al. | 707/201 |
| 2007/0226277 A1 * | 9/2007 | Holenstein et al. | 707/204 |
| 2007/0255787 A1 * | 11/2007 | Richardson et al. | 709/204 |
| 2008/0028000 A1 * | 1/2008 | Makismenka et al. | 707/201 |
| 2008/0126364 A1 * | 5/2008 | Khosravy | H04L 67/1095 |
| 2008/0147781 A1 * | 6/2008 | Hopmann et al. | 709/203 |

OTHER PUBLICATIONS

Author Unknown, "Replicating and synchronizing Data Between Directory Servers," http://www.isode.com/whitepapers/replication-sync.html; 2002-2015 Isode Ltd Copyright, downloaded Feb. 1, 2016, pp. 1-6.

Dumitriu et al., "Peer-to-Peer Wikis: Replication of Highly Dynamic Content on XWiki," http://dl.acm.org/citation.cfm?id=1339252, IEEE Computer Society Washington, DC 2007, pp. 361-366.

Notification of Transmittal of the International Search Report and the Written Opinion of the International Searching Authority, or the Declaration received in International Patent Application No. PCT/IB2008/005014, Date of Mailing Sep. 16, 2016, pp. 1-25.

\* cited by examiner

| original identity / replicated identity | |
|---|---|
| object A<br>object B<br>object C<br>object D | object 1<br>object 2<br>object 3<br>object 4 |

| original identity | replicated identity |
|---|---|
| object A | object 1 |
| object B | object 2 |
| object C | object 3 |
| object D | object 4 |
| object E | object 5 |

| original identity / replicated identity | |
|---|---|
| object A | object 1 |
| object B | object 2 |
| object C | object 3 |
| object D | object 4 |
| object E | object 5 |
| object F | object 6 |

SYSTEM AND METHOD FOR SYNCHRONIZATION BETWEEN SERVERS

TECHNICAL FIELD

This disclosure generally relates to synchronizing data between two or more servers, and more particularly relates to performing a transformation of commands performed against one server to modified commands performed against other servers.

BACKGROUND

Applications that operate against an offline server, and reconnect with an online server must synchronize data between the offline server and the online server, e.g., to account for any changes in data that occurred while operating against the offline server. Data or record level synchronization transfers data from the offline database directly to the online database when the application reconnects with the online server. The direct data transfer from the offline database to the online database may lead to unrecognized and/or irreparable conflicts during the synchronization process. For example, an offline command may produce a new record in the offline database. However, in the context of the online database the command may not be allowed or valid. For example, the user may not have the required privileges to execute the command. Thus, transferring the data produced or modified by the command directly from one database to the other would lead to a conflict in the target database.

One synchronization scheme that seeks to avoid the problems associated with data or record level synchronization is a command replay synchronization scheme. In a command synchronization scheme the command executed against the offline server may be stored and then replayed against the online server when the application reconnects to the online server. However, commands that are executed against the offline server may not execute in the same manner against the online server. For example, an offline command may include references to objects in the offline system that do not exist in the same context in the online server. Additionally, the online server may behave differently than the offline server when executing a command. The difference in behavior may cause a portion of the remaining commands to have invalid references that may cause the portion of the remaining commands to fail.

SUMMARY OF THE INVENTION

In a first implementation a method includes replicating at least a portion of an original data set, associated with a first server, to provide a replicated data set, associated with a second server, the replicated data set based upon, at least in part, the original data set. One or more second-server commands executed on the replicated data set by the second server are stored. One or more first-server commands to be executed on the original data set by the first server, are provided in which the one or more first-server commands are based upon, at least in part, the one or more second-server commands. One or more first-server output objects, returned by the first server in response to the one or more first-server commands, are compared to one or more second-server output objects, returned by the second server in response to the one or more second-server commands. An identity of one or more first-server output objects is mapped to an identity of the one or more second-server output objects.

One or more of the following features may be included. Replicating at least a portion of the original data set may include generating one or more replicating commands to be executed by the second server. An identity of one or more objects of the original data set may be mapped to an identity of one or more replicated output objects produced by the one or more replicating commands. Replicating at least a portion of the original data set may further include providing an identity of an input object of the one or more replicating commands based upon, at least in part, the mapped identity of the one or more objects of the original data set to the identity of the one or more replicated output objects.

Storing the one or more second-server commands may include storing the one or more second-server commands, storing one or more input objects of the one or more second-server commands, and storing one or more second-server output objects produced by the one or more second-server commands. Comparing the one or more first-server output objects to the one or more second-server output objects may include comparing the one or more first-server output objects, returned by the first server in response to the one or more first-server commands, to the stored one or more second-server output objects.

Providing the one or more first-server commands may include providing one or more first-server input objects based upon, at least in part, the mapped identity of the one or more first-server output objects to the identity of the one or more second-server output objects. Storing the one or more second-server commands may include associating a sequential order with the second server commands. Further, providing the one or more first-server commands based upon, at least in part, the one or more second-server commands, may include sequentially providing the one or more first-server commands in an order based upon, at least in part, the sequential order of the second-server commands. Comparing the one or more first server output objects to the one or more second server output objects may include comparing each of the one or more first-server output objects, returned by the first server in response to each of the one or more first-server commands, to the one or more second-server output objects, returned by the second server in response to the one or more second-server commands as the one or more first server commands are sequentially executed. Additionally, an identity of each of the one or more first-server output objects may be mapped to an identity of the one or more second-server output objects as the one or more first server commands are sequentially executed.

The first server may include an online server and the second server may include an offline server.

In another implementation, a computer program product residing on a computer readable medium has a plurality of instructions stored thereon. When executed by a processor, the instructions cause the process to perform operations including replicating at least a portion of an original data set, associated with a first server, to provide a replicated data set, associated with a second server, the replicated data set based upon, at least in part, the original data set. One or more second-server commands executed on the replicated data set by the second server are stored. One or more first-server commands to be executed on the original data set by the first server, are provided in which the one or more first-server commands is based upon, at least in part, the one or more second-server commands. One or more first-server output objects, returned by the first server in response to the one or more first-server commands, are compared to one or more second-server output objects, returned by the second server in response to the one or more second-server commands. An identity of one or more first-server output objects are mapped to an identity of the one or more second-server output objects.

One or more of the following features may be included. The instructions for replicating at least a portion of the original data set may include instructions for generating one or more replicating commands to be executed by the second server. The instructions for replicating at least a portion of the original data set may further include instructions for mapping an identity of one or more objects of the original data set to an identity of one or more replicated output objects produced by the one or more replicating commands. The instructions for replicating at least a portion of the original data set may include instructions for providing an identity of an input object of the one or more replicating commands based upon, at least in part, the mapped identity of the one or more objects of the original data set to the identity of the one or more replicated output objects.

The instructions for storing the one or more second-server commands may include instructions for storing the one or more second-server commands, storing one or more input objects of the one or more second-server commands, and storing one or more second-server output objects produced by the one or more second-server commands. Further, the instructions for comparing the one or more first-server output objects to the one or more second-server output objects may include instructions for comparing the one or more first-server output objects, returned by the first server in response to the one or more first-server commands, to the stored one or more second-server output objects.

The instructions for providing the one or more first-server commands may include instructions for providing one or more first-server input objects based upon, at least in part, the mapped identity of the one or more first-server output objects to the identity of the one or more second-server output objects. The instructions for storing the one or more second-server commands may include instructions for associating a sequential order with the second server commands. Further, the instructions for providing the one or more first-server commands based upon, at least in part, the one or more second-server commands, may include instructions for sequentially providing the one or more first-server commands in an order based upon, at least in part, the sequential order of the second-server commands. Additionally, the instructions for comparing the one or more first server output objects to the one or more second server output objects may include instructions for comparing each of the one or more first-server output objects, returned by the first server in response to each of the one or more first-server commands, to the one or more second-server output objects, returned by the second server in response to the one or more second-server commands as the one or more first server commands are sequentially executed. Additionally, an identity of each of the one or more first-server output objects may be mapped to an identity of the one or more second-server output objects as the one or more first server commands are sequentially executed.

The first server may include an online server. The second server may include an offline server.

The details of one or more implementations are set forth in the accompanying drawings and the description below. Other features and advantages will become apparent from the description, the drawings, and the claim.

BRIEF DESCRIPTION OF THE DRAWINGS

FIG. 7 diagrammatically depicts an identity map.

FIG. 10 diagrammatically depicts an identity map.

FIG. 12 diagrammatically depicts an identity map.

DETAILED DESCRIPTION OF THE DISCLOSURE

Figure 1:
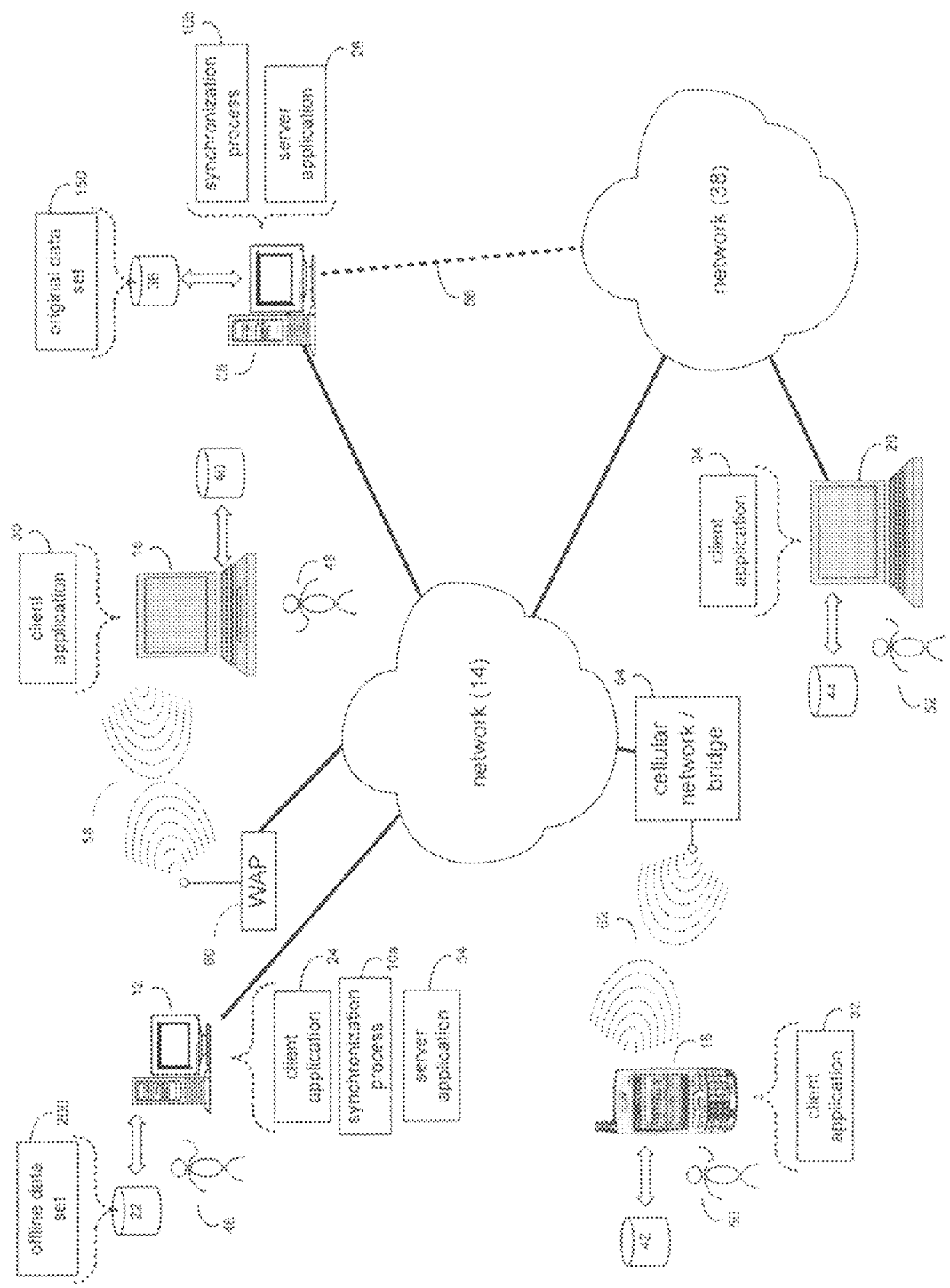
FIG. 1 is a diagrammatic view of a synchronization process and a first and a second server application coupled to a distributed computing network.

Referring to FIG. 1, there is shown synchronization process 10a that may reside on and may be executed by a client electronic device (e.g., personal computer 12) which may be connected to network 14 (e.g., the Internet or a local area network). While for clarity synchronization process 10a is only shown and described associated with client electronic device 12, it should be understood that synchronization process 10a may reside on and be executed various other client electronic devices (e.g., client electronic devices 16, 18, and 20) in a corresponding manner. Examples of client electronic device may include, but are not limited to: a personal computer (e.g., personal computer 12), a laptop computer (e.g., laptop computer 16), a personal digital assistant (e.g., personal digital assistant 18), and a notebook computer (e.g., notebook computer 20). Client electronic devices 12, may execute an operating system, examples of which may include but are not limited to Microsoft Windows™, Microsoft Windows CE™, Redhat Linux™, or a custom operating system.

The instruction sets and subroutines of synchronization process 10a, which may be stored on a storage device (e.g., storage device 22 coupled to client electronic device 12, in the illustrated example) may be executed by one or more processors (not shown) and one or more memory architectures (not shown) incorporated into client electronic device 12. Storage device 22 (e.g., a computer readable storage medium limited to non-transitory media) may include but is not limited to: hard disk drives; tape drives; optical drives; RAID arrays; random access memories (RAM); read-only memories (ROM), compact flash (CF) storage devices, secure digital (SD) storage devices, and a memory stick storage devices.

Client electronic device 12 may also execute a client application (e.g., client application 24). Client application 24 may be an application capable of issuing commands to one or more server applications (e.g., first server application 26). Examples of client application 22 may include, for example, an email client application, a calendar and scheduling application, a document management application, a database application, etc. The instruction sets and subroutines of client application 24, which may be stored on storage device 22 coupled to client electronic device 12, may be executed by one or more processors (not shown) and one or more memory architectures (not shown) incorporated into client electronic device 12. Synchronization process 10 may be a stand alone application that interfaces with client application 24 or an applet/application that is executed within client application 24.

A server computer (e.g., server computer 28) may execute first server application 26. Generally, first server application 26 may be any application which may execute commands issued by one or more client applications (e.g., client application 24, 30, 32, 34) via a defined command interface. Examples of first server application 26 may include but are not limited to an email server application, a calendar and scheduling server application, a document management server application, a database server application, etc. The instruction sets and subroutines of first server application 26, which may be stored on storage device 36 coupled to server computer 28 may be executed by one or more processors (not shown) and one or more memory architectures (not shown) incorporated into server computer 28.

In addition/as an alternative to being a client-side application residing on client electronic device 12, the synchronization process may be a server-side application (e.g., server-side synchronization process 10*b*) residing on a storage device (e.g., stored on storage devices 30) coupled to one or more server computers (e.g., server computer 28). As a server-side application, synchronization process 10*b* may, for example, be a stand alone application that may interface with an a server application (e.g., first server application 26), or may be an applet/application that is executed within server application. Accordingly, the synchronization process may be a server-side process, a client-side process and/or may be a hybrid client-side/server-side process, which may be executed, in whole or in part, by a client electronic device and by a server computer.

Server computer 28 may be a web server (or a series of servers) running a network operating system, examples of which may include but are not limited to: Microsoft Windows 2003 Server™; Novell Netware™; or Redhat Linux™, for example. Additionally, server computer 28 may execute a web server application, examples of which may include but are not limited to: Microsoft IIS™, Novell Webserver™, or Apache Webserver™, that allows for HTTP (i.e., HyperText Transfer Protocol) access to server computer 28 via network 14. Network 14 may be connected to one or more secondary networks (e.g., network 38), examples of which may include but are not limited to: a local area network; a wide area network; or an intranet, for example.

The instruction sets and subroutines of client applications 12, 30, 32, 34, which may be stored on storage devices 22, 40, 42, 44 (respectively) and/or coupled to client electronic devices 12, 16, 18, 20 (respectively), may be executed by one or more processors (not shown) and one or more memory architectures (not shown) incorporated into client electronic devices 12, 16, 18, 20 (respectively). Storage devices 22, 40, 42, 44 (e.g., computer readable storage media limited to non-transitory media) may include but are not limited to: hard disk drives; tape drives; optical drives; RAID arrays; random access memories (RAM); read-only memories (ROM), compact flash (CF) storage devices, secure digital (SD) storage devices, and memory stick storage devices. As mentioned above, examples of client electronic devices may include, but are not limited to, personal computer 12, laptop computer 16, personal digital assistant 18, notebook computer 20, a data-enabled, cellular telephone (not shown), and a dedicated network device (not shown), for example. Using client applications 24, 30, 32, 34, users 46, 48, 50, 52 may access first server application 26.

Additionally, one or more additional server application (e.g., second server application 54) may reside on and be executed by one or more additional computing devices (e.g., may reside on storage device 22 coupled to client electronic device 12). Second server application 54 may utilize the same command interface as first server application 26. For example, second server application 54 may be an instance of the same application as first server application 26, or may be a different application utilizing the same command interface. Users 46, 48, 50, 52 may also access second server application 54 using client applications 24, 30, 32, 34.

Users 46, 48, 50, 52 may access first server application 26 directly through the device on which the client application (e.g., client applications 24, 30, 32, 34) is executed, namely client electronic devices 12, 16, 18, 20, for example. Users 46, 48, 50, 52 may access first server application 26 directly through network 14 or through secondary network 38. Further, server computer 28 (i.e., the computer that executes first server application 26) may be connected to network 14 through secondary network 38, as illustrated with phantom link line 56.

The various client electronic devices may be directly or indirectly coupled to network 14 (or network 38). For example, personal computer 12 is shown directly coupled to network 14 via a hardwired network connection. Further, notebook computer 20 is shown directly coupled to network 38 via a hardwired network connection. Laptop computer 16 is shown wirelessly coupled to network 14 via wireless communication channel 58 established between laptop computer 16 and wireless access point (i.e., WAP) 60, which is shown directly coupled to network 14. WAP 60 may be, for example, an IEEE 802.11a, 802.11b, 802.11g, Wi-Fi, and/or Bluetooth device that is capable of establishing wireless communication channel 58 between laptop computer 16 and WAP 60. Personal digital assistant 18 is shown wirelessly coupled to network 14 via wireless communication channel 62 established between personal digital assistant 18 and cellular network/bridge 64, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Synchronization Process

Figure 2:
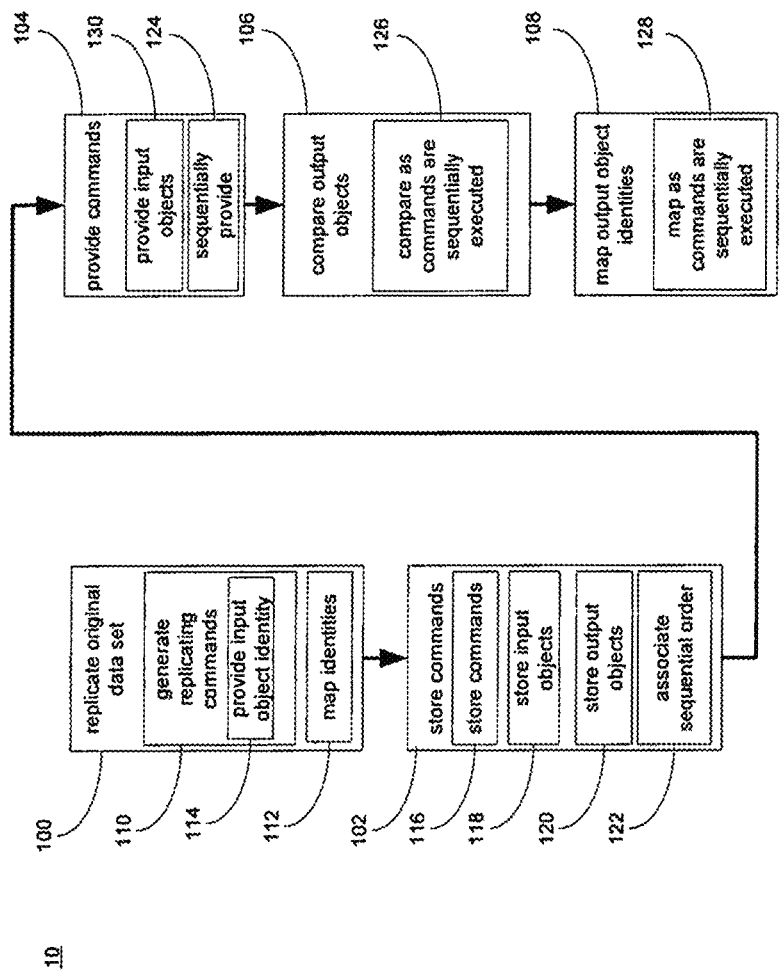
FIG. 2 is a flow chart of a process executed by the synchronization process of FIG. 1.

Referring also to FIG. 2, synchronization process 10*a*, 10*b* may replicate 100 at least a portion of an original data set associated with a first server, to provide a replicated data set, associated with a second server, the replicated data set based upon, at least in part, the original data set. Additionally, synchronization process 10*a*, 10*b* may store 102 one or more second-server commands executed on the replicated data set by the second server. One or more first-server commands to be executed on the original data set by the first server, may be provided 104 in which the one or more first-server commands are based upon, at least in part, the one or more second-server commands. One or more first-server output objects, returned by the first server in response to the one or more first-server commands, may be compared 106 to one or more second-server output objects, returned by the second server in response to the one or more second-server commands. An identity of one or more first-server output objects may be mapped 108 to an identity of the one or more second-server output objects.

Figure 3:
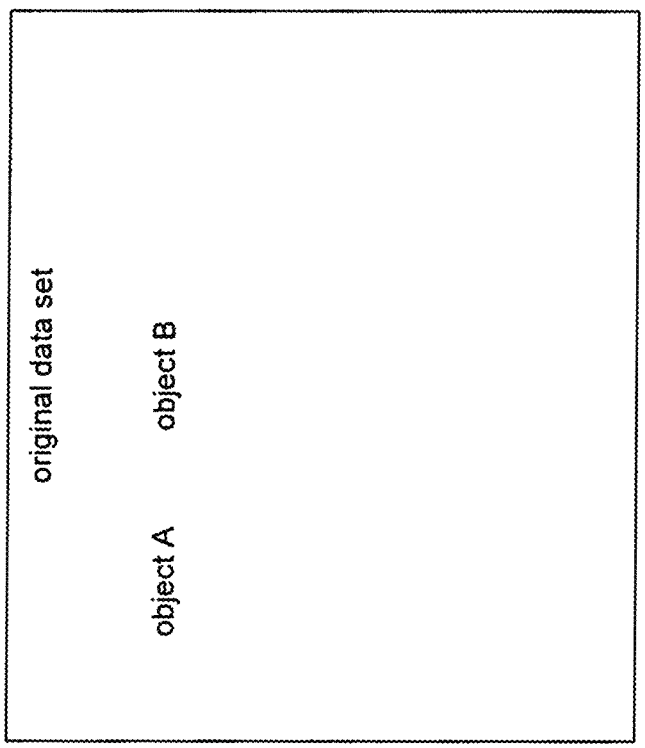
FIG. 3 diagrammatically depicts a data set associated with the first server application of FIG. 1.

Continuing with the above-stated example, and referring also to FIG. 3, using client application 24 a user, e.g., user 46, may manipulate original data set 150 (e.g., residing on storage device 36) associated with first server application 26, e.g., by issuing commands, via client application 24, to first server application 26. For example, as shown, original data set 150 may include one or more objects (e.g., which may be, for example, files, containers, applications, and the like), namely object "A", and object "B". Of course, original data set 150 may include any number of objects of various natures.

Figure 4:
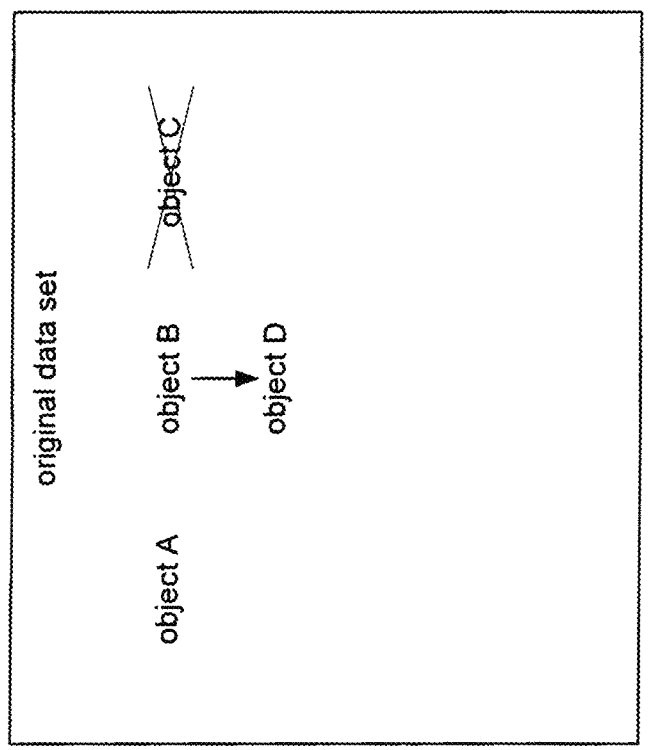
FIG. 4 diagrammatically depicts a data set associated with the first server application of FIG. 1.

First server application 26 may, e.g., in response to commands issued by client application 24, add, modify, delete, etc. objects within original data set 150. For example, and referring also to FIG. 4, user 46 may, via client application 24, issue commands to first server application 26 to create object "C" in original data set 150. Additionally, user 46 may, via client application 24, issue commands to first server application 26 to modify object "A" to provide modified object "A" in original data set 150. User 46 may, via client application 24, also issue commands to first server application 26 to add child object "D" to object "B". Similarly, user 46 may, via client application 24, issue commands to first server application 26 to delete object "C" (e.g., diagrammatically represented by X through object "C").

User 46 may replicate 100 at least a portion of original data set 150, associated with first server application 26, to provide a replicated data set associated with a second server application (e.g., second server application 54) based upon, at least in part, original data set 150. By replicating 100 at least a portion of original data set 150, user 46 may continue to utilize client application 24, e.g., to add, modify, delete, etc., objects without accessing first server application 26 and original data set 150 associated with first server application 26. For example, first server application 26 may be an online server application accessed via network 14. Similarly, second server application 54 may be an offline server, e.g., allowing user 46 to utilize client application 24 to access second server application 54 and manipulate the replicated data set when client electronic device 12 is not coupled to server computer 28 (e.g., when client electronic device 12 and/or server computer 26 are not coupled to network 14). User 46 may cause synchronization process 10a, 10b to replicate 100 at least a portion of original data set 150, e.g., by issuing, via client application 24, a synchronization command, logging off of first server application 26, logging off of client application 24, or any other suitable mechanism.

Replicating 100 at least a portion of the original data set may include generating 110 one or more replicating commands to be executed by the second server. For example, user 46 may issue, via client application 24, a synchronization command causing synchronization process 10a, 10b to replicate 100 at least a portion of original data set 150.

Figure 5:
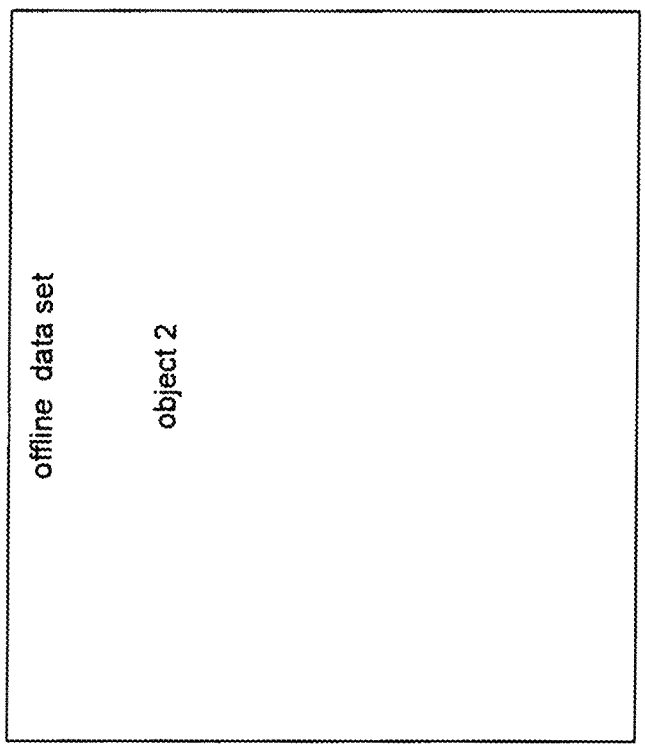
FIG. 5 diagrammatically depicts a data set associated with the second server application of FIG. 1.

Referring also to FIG. 5, offline data set 200 may reside on storage device 22 coupled to client electronic device 12. Offline data set 200 may be associated with second server application 54. Offline data set 200 may include one or more objects, namely object "2". In response to the synchronization command, one or more of synchronization process 10a, 10b, client application 24, first server application 26, and/or second server application 54 may generate 110 one or more replicating commands which, when executed by second server application 54, may create the replicated data set based upon, at least in part, original data set 150.

For example, in part, first server application 26 may provide one or more commands representing original data set 150. The generated 110 replicating commands may be based upon, at least in part, the one or more commands provided by first server application 26. When executed by second server application 54, the generated 110 replicating commands may modify offline data set 200 to provide the replicated data set, e.g., by creating, deleting, modifying, etc. one or more objects in offline data set 200. Accordingly, generated 110 replicating commands may provide one or more objects in the replicated data set based upon, at least in part, the commands provided by first server application 26. Continuing with the above-stated example, the commands provided by first server application 26 may include, for example, at least in part: add object "A", add object "B", add object "C", add child object "D" to object "B", remove object "C" and modify object "A".

Synchronization process 10a, 10b may map 112 an identity of one or more objects of the original data set to an identity of one or more replicated output objects produced by the one or more replicating commands. For example, and referring also to FIG. 6, second server application 54 may utilize a different object naming scheme than first server application 26. As such, a generated 110 replicating command to create object "A" may result in second server application 54 creating object "1" in offline data set 200, as part of replicated data set 202. Synchronization process 10a, 10b may map 112 the identity of object "A" in original data set 150 to the identity of object "1" in replicated data set 202, as shown in FIG. 7.

Continuing with the above stated example, one or more of synchronization process 10a, 10b, client application 24, first server application 26, and/or second server application 54 may recognize that object "2" in offline data set 200 corresponds to object "B" in original data set 150 (e.g., object "B" may have previously been mapped to object "2"). As such, a generated 110 replicating commands may modify object "2" in offline data set 200 to provide, in replicated data set 202, a replicated object based upon, at least in part, object "B". The identity of object "B" may be mapped 112 to the identity of object "2". Additionally, a generated 110 replicating command may result in second server application 54 creating, in replicated data set 202, object "3" based upon, at least in part, object "C".

As shown in FIG. 7 one or more of synchronization process 10a, client application 24, and/or second server application 54 may create identity map 250. Identity map 250 may correlate the identities of one or more objects in original data set 150 with the identities of one or more objects in replicated data set 202, in which at least a portion of the one or more objects in replicated data set 202 may be based upon, at least in part, the one or more objects in original data set 150.

Replicating 100 at least a portion of the original data set may further include providing 114 an identity of an input object of the one or more replicating commands based upon, at least in part, the mapped identity of the one or more objects of the original data set to the identity of the one or more replicated output objects. Continuing with the above stated example, a replicating command may be generated 110 to provide a replicated object based upon, at least in part, a command provided by first server application 26 to add object "D" as a child of object "B". As object "2" has been provided in replicated data set 202 as an object based upon, at least in part, object "B" of original data set 150 (e.g., as reflected in identity map 250), the generated 110 replicating command may provide 114 an identity of object "2" as an input to the replicating command. As such, rather than providing a replicating command to add object "D" as a child of object "B", the replicating command may be, for example, add object "D" as a child of object "2". The result of the replicating command may be object "4" added to object "2" in replicated data set 202. Object "4" may be based upon object "D" in original data set 150. In the foregoing manner, the generated 110 replicating command may reference the mapped 112 identities of objects in replicated data set 202 to identities of objects in original data set 150 for creating, adding, deleting, or modifying replicated objects that reference the identity of one or more previously created, added, deleted, or modified objects in replicated data set 202.

Similar to the addition of child object "4" to object "2", described above, a command provided by first server application 26 to modify object "A" may result in generating 110 a replicating command to modify object "1" based upon the mapped 112 identity of object "A" to object "1". That is, an identity of input object "1" of the one or more replicating commands may be provided 114 based upon, at least in part, the mapped identity of object "A" to object "1".

Figure 6:
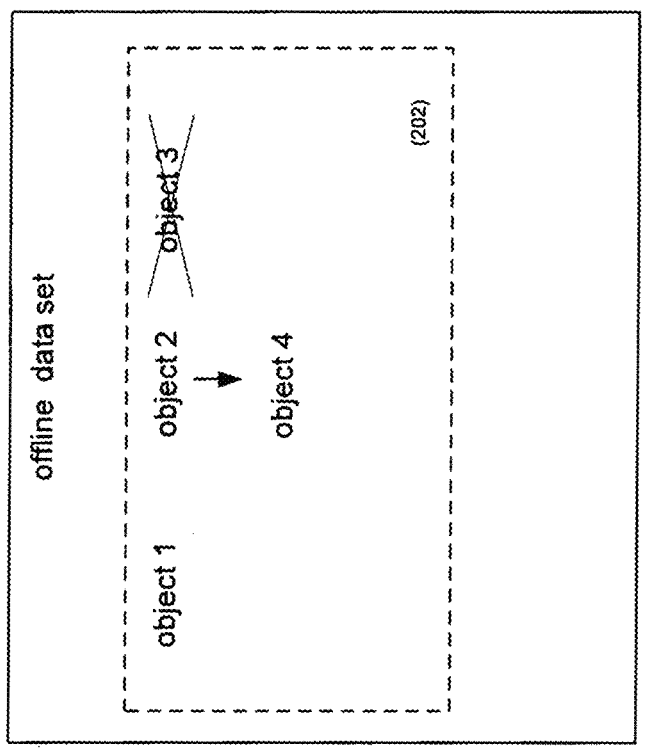
FIG. 6 diagrammatically depicts a data set associated with the second server application of FIG. 1.

Furthermore, based upon the command provided by first server application 26, a replicating command may be generated 110 to delete object "3" (correlated to object "C" in original data set 150) from replicated data set 202 (e.g., diagrammatically represented by X through object "3" in FIG. 6). Alternatively, based upon commands provided by first server application 26 to both create and delete object "C", generated 110 replicating commands may not add an object based upon, at least in part, object "C" in the first place.

Figure 8:
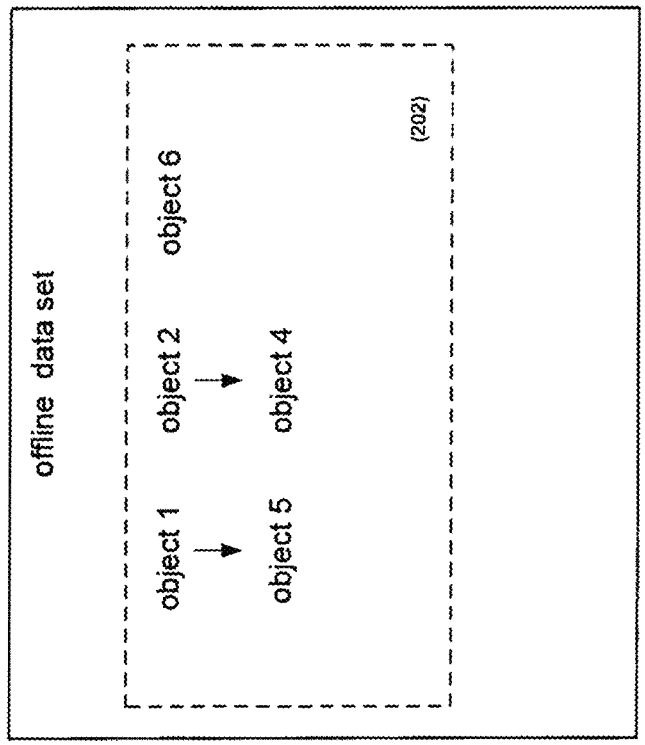
FIG. 8 diagrammatically depicts a data set associated with the second server application of FIG. 1.

Using client application 24, user 46 may perform various operations (e.g., by issuing commands via client application 24 which may be executed by second server application 54) on replicated data set 202. For example, and referring also to FIG. 8, user 46 may cause client application 24 to issue a command to second server application 54 that results in creating new object "5". User 46 may also, via client application 24, associate (e.g., as a child) object "5" with object "1". Additionally, user 46 may modify object "1" of replicated data set 202 to provide modified object "1". Further, user 46 may, via client application 24, create new object "6" in replicated data set 202. As mentioned previously, synchronization process 10a may store 102 the one or more second-server commands executed on the replicated data set by the second server.

Storing 102 the one or more second-server commands may include storing 116 the one or more second-server commands, storing 118 one or more input objects of the one or more second-server commands, and storing 120 one or more second-server output objects produced by the one or more second-server commands. For example, when user 46 modifies object "1" (i.e., via client application 24 issuing commands to second server application 54), synchronization process 10a may store 116 the modify command. Synchronization process 10a may also store 118 one or more input objects of the modify command (e.g., including object "1"). Synchronization process 10 may also store 120 output object (e.g., modified object "1") produced by the modify command. For example, a command to modify object "1" by changing a name attribute to "Bill" may result in a stored command of, for example, command name: "modify", input (i.e., input argument) 1: object "1", input (i.e., input argument) 2: "name", and input (i.e., input argument) 3: "Bill", resulting in output object: modified object "1".

Storing 102 the one or more second-server commands may include associating 122 a sequential order with the second server commands. Continuing with the above-stated example, commands issued by client application 24 to second server application 54 may have first created object "5", and next associated object "5" with object "3", and subsequently modified object "1", and created object "6". Synchronization process 10a may associate 122 a sequential order (e.g., first create object "5", second associate object "5" with object "1", third modify object "1", fourth create object "6") with the stored 102 second server commands.

When user 46 again accesses first server application 26, one or more of synchronization process 10a, 10b, client application 24, first server application 26, and/or second server application 54 may synchronize offline data set 200 and original data set 150. Synchronizing offline data set 200 and original data set 150 may include providing 104 one or more first-server commands to be executed on the original data set by the first server. The one or more first-server commands may be based upon, at least in part, the stored 102 one or more second-server commands. For example, the one or more stored 102 second server commands may be replayed against original data set 150. Further, providing 104 the one or more first-server commands based upon, at least in part, the one or more second-server commands, may include 124 sequentially providing the one or more first-server commands in an order based upon, at least in part, the sequential order of the second-server commands.

Figure 9:
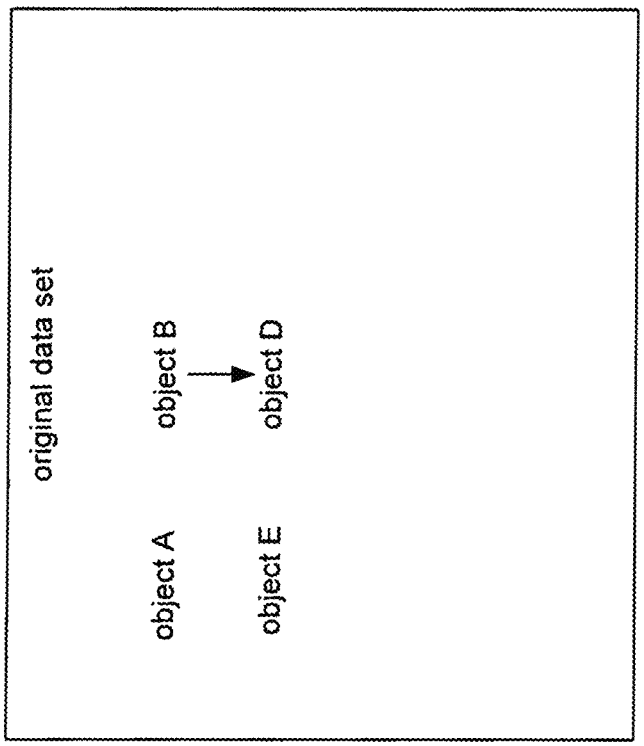
FIG. 9 diagrammatically depicts a data set associated with the first server application of FIG. 1.

Continuing with the above-stated example, and referring also to FIG. 9, the first command provided 104 may be to create object "5". First server application 26 may execute the command to create object "5". Based upon, at least in part, the different object naming scheme, the command executed by first server application 26 to create object "5" may result in first server application 26 creating object "E" in original data set 150.

One or more of synchronization process 10a, 10b, client application 24, first server application 26, and/or second server application 54 may compare 106 one or more first-server output objects (e.g., object "E"), returned by the first server (e.g., first server application 26) in response to the one or more first server commands, to one or more second server output objects (e.g., object "5"), returned by the second server (e.g., second server application 54) in response to the one or more second server commands. In this regard, comparing 106 the one or more first-server output objects (e.g., object "E") to the one or more second-server output objects (e.g., object "5") may include comparing the one or more first-server output objects (e.g., object "E"), returned by the first server (e.g., first server application 26) in response to the one or more first-server commands, to the stored 102 one or more second-server output objects (e.g., object "5"). Additionally, in an embodiment in which the first-server commands are sequentially provided 124, comparing 106 the one or more first-server output objects (e.g., object "E") to the one or more second-server output objects (e.g., object "5") may include sequentially comparing 126 each of the one or more first-server output objects (e.g., object "E"), returned by the first server (e.g., first server application 26) in response to each of the one or more first-server commands, to the one or more second-server output objects (e.g., object "5"), returned by the second server (e.g., second server application 54) in response to the one or more second-server commands as the one or more first server commands are sequentially executed.

Continuing with the above-stated example, one or more of synchronization process 10a, 10b, client application 24, first server application 26, and/or second server application 54 may compare 106 object "E" to object "5". An identity of one or more first-server output objects may be mapped 108 to an identity of the one or more second-server output objects. For example, and referring also to FIG. 10, one or more of synchronization process 10a, 10b, client application 24, first server application 26, and/or second server application 54 may update identity map 250 to map the identity of object "E" in original data set 150 to the identity of object "5" in offline data set 200. Again, in an embodiment in which first-server commands may be sequentially provided 124, an identity of each of the one or more first-server output objects may be mapped 128 to an identity of the one or more second-server output objects as the one or more first server commands are sequentially executed (e.g., sequentially mapped).

Providing 104 the one or more first-server commands may include providing 130 one or more first-server input objects based upon, at least in part, the mapped identity of the one or more first-server output objects to the identity of the one or more second-server output objects. Continuing with the above-stated example, one or more of synchronization process 10a, 10b, client application 26, first server application 26, and/or second server application 54 may next provide a first-server command (e.g., a command to first server application 26) based upon the command to associate object "5" with object "3". Based upon, at least in part, the mapped identities of the objects in original data set 150 and of the objects in offline data set 200, a command may be provided to associate object "E" in original data set 150 with object "A" in original data set 150. That is, the identity of the input object(s) for the command provided 104 to first server application 26 may be based upon, at least in part, the mapped identities of objects (e.g., object "E" and object "A") in original data set 150 to objects (e.g., object "5" and object "1") in offline data set 200. As such, object "E" may be associated with object "A" in original data set 150, based upon, at least in part, the association between object "5" and object "1" in offline data set 200.

Similarly, a first server command may be provided 104 to modify object "A" to change the name attribute to "Bill". The command input object may be based upon, at least in part, the mapped identity of offline object "1" to original object "A". As such, the command provided may be to modify the name attribute of original object "A" to "Bill".

As discussed previously, differences in object naming (identities provided to objects) between original data set 150 and offline data set 200 may occur, for example, as a result of different object naming schemes utilized by first server application 26 and second server application. However, differences in object naming may occur for various addition/alternative reasons. For example, a user may not have the necessary permissions to add, delete, or modify an object, an object to be added, deleted, or modified may create a conflict with another object, as well as various other reasons.

Figure 11:
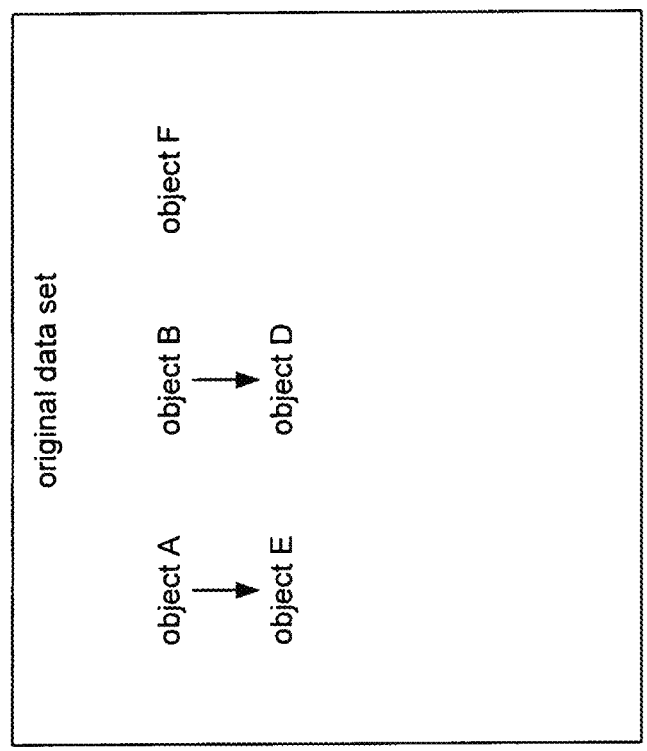
FIG. 11 diagrammatically depicts a data set associated with the first server application of FIG. 1.

Continuing with the above stated example, and referring also to FIG. 11, one or more of synchronization process 10a, 10b, client application 24, first server application 26, and/or second server application 54 may provide 104 a command to first server application 26 based upon the command executed by second server application 54 to create object "6". However, user 46 may not have sufficient permissions to create object "6". Based upon, at least in part, user 46's insufficient permissions to create object "6", first server application 26 may fail to create object "6" and may return an error message. Alternatively, in view of user 46's insufficient permissions, rather than trying to create object "6" (e.g., which would result in a failure), synchronization process 10a, 10b, client application 24, first server application 26, and/or second server application 54 may provide 104 a command to create new object "F" in original data set 150 (e.g., in original data set 150, in a conflict folder, or other location and/or container; not shown). New object "F" may be based upon object "6". Identity map 250 may be updated to indicate the mapped identity of object "6" in offline data set 200 to object "F" in original data set 150, as shown in FIG. 12.

A number of implementations have been described. Nevertheless, it will be understood that various modifications may be made. Accordingly, other implementation are within the scope of the following claims.

What is claimed is:

1. A method comprising:
replicating at least a portion of an original data set, associated with a first server, to provide a replicated data set, associated with a second server, the replicated data set based upon, at least in part, the original data set;
storing one or more second-server commands executed on the replicated data set by the second server;
providing one or more first-server commands to be executed on the original data set by the first server, the one or more first-server commands based upon, at least in part, the one or more second-server commands;
comparing one or more first-server output objects, returned by the first server in response to the one or more first-server commands, to one or more second-server output objects, returned by the second server in response to the one or more second-server commands;
mapping an identity of one or more first-server output objects to an identity of the one or more second-server output objects;
wherein providing the one or more first-server commands includes providing one or more first-server input objects based upon, at least in part, the mapped identity of the one or more first-server output objects to the identity of the one or more second-server output objects, and wherein providing the one or more first-server commands includes determining insufficient permissions associated with the second-server commands and generating an error based on the insufficient permissions;
in response to the insufficient permissions associated with the second-server commands, creating a new first-server output object in a conflict location on the first server and executing the one or more second-server commands associated with the insufficient permissions on the new first-server output object; and
mapping an identity of the new first-server output object to at least one of the one or more second-server output objects associated with the insufficient permissions and the second-server commands.

2. The method of claim 1, wherein replicating at least a portion of the original data set includes generating one or more replicating commands to be executed by the second server; and mapping an identity of one or more objects of the original data set to an identity of one or more replicated output objects produced by the one or more replicating commands, and wherein replicating at least a portion of the original data set includes providing an identity of an input object of the one or more replicating commands based upon, at least in part, the mapped identity of the one or more objects of the original data set to the identity of the one or more replicated output objects.

3. The method of claim 1, wherein storing the one or more second-server commands includes storing the one or more second-server commands, storing one or more input objects of the one or more second-server commands, and storing one or more second-server output objects produced by the one or more second-server commands.

4. The method of claim 3, wherein comparing the one or more first-server output objects to the one or more second-server output objects includes comparing the one or more first-server output objects, returned by the first server in response to the one or more first-server commands, to the stored one or more second-server output objects.

5. The method of claim 1, wherein storing the one or more second-server commands includes associating a sequential order with the second server commands.

6. The method of claim 5, wherein providing the one or more first-server commands based upon, at least in part, the one or more second-server commands, includes sequentially providing the one or more first-server commands in an order based upon, at least in part, the sequential order of the second-server commands.

7. The method of claim 6, wherein comparing the one or more first server output objects to the one or more second server output objects includes comparing each of the one or more first-server output objects, returned by the first server in response to each of the one or more first-server commands, to the one or more second-server output objects, returned by the second server in response to the one or more second-server commands as the one or more first server commands are sequentially executed; and
   mapping an identity of each of the one or more first-server output objects to an identity of the one or more second-server output objects as the one or more first server commands are sequentially executed.

8. The method of claim 1, wherein the first server includes an online server and the second server includes an offline server.

9. A computer program product residing on a computer readable non-transitory storage medium having a plurality of instructions stored thereon which, when executed by a processor, cause the process to perform operations comprising:
   replicating at least a portion of an original data set, associated with a first server, to provide a replicated data set, associated with a second server, the replicated data set based upon, at least in part, the original data set;
   storing one or more second-server commands executed on the replicated data set by the second server;
   providing one or more first-server commands to be executed on the original data set by the first server, the one or more first-server commands based upon, at least in part, the one or more second-server commands;
   comparing one or more first-server output objects, returned by the first server in response to the one or more first-server commands, to one or more second-server output objects, returned by the second server in response to the one or more second-server commands;
   mapping an identity of one or more first-server output objects to an identity of the one or more second-server output objects;
   wherein providing the one or more first-server commands includes providing one or more first-server input objects based upon, at least in part, the mapped identity of the one or more first-server output objects to the identity of the one or more second-server output objects, and wherein providing the one or more first-server commands includes determining insufficient permissions associated with the second-server commands and generating an error based on the insufficient permissions;
   in response to the insufficient permissions associated with the second-server commands, creating a new first-server output object in a conflict location on the first server and executing the one or more second-server commands associated with the insufficient permissions on the new first-server output object; and
   mapping an identity of the new first-server output object to at least one of the one or more second-server output objects associated with the insufficient permissions and the second-server commands.

10. The computer program product of claim 9, wherein the instructions for replicating at least a portion of the original data set include instructions for generating one or more replicating commands to be executed by the second server; and mapping an identity of one or more objects of the original data set to an identity of one or more replicated output objects produced by the one or more replicating commands, and wherein the instructions for replicating at least a portion of the original data set include instructions for providing an identity of an input object of the one or more replicating commands based upon, at least in part, the mapped identity of the one or more objects of the original data set to the identity of the one or more replicated output objects.

11. The computer program product of claim 9, wherein the instructions for storing the one or more second-server commands include instructions for storing the one or more second-server commands, storing one or more input objects of the one or more second-server commands, and storing one or more second-server output objects produced by the one or more second-server commands.

12. The computer program product of claim 11, wherein the instructions for comparing the one or more first-server output objects to the one or more second-server output objects include instructions for comparing the one or more first-server output objects, returned by the first server in response to the one or more first-server commands, to the stored one or more second-server output objects.

13. The computer program product of claim 9, wherein the instructions for storing the one or more second-server commands include instructions for associating a sequential order with the second server commands.

14. The computer program product of claim 13, wherein the instructions for providing the one or more first-server commands based upon, at least in part, the one or more second-server commands, include instructions for sequentially providing the one or more first-server commands in an order based upon, at least in part, the sequential order of the second-server commands.

15. The computer program product of claim 14, wherein the instructions for comparing the one or more first server output objects to the one or more second server output objects include instructions for comparing each of the one or more first-server output objects, returned by the first server in response to each of the one or more first-server commands, to the one or more second-server output objects, returned by the second server in response to the one or more second-server commands as the one or more first server commands are sequentially executed; and
   mapping an identity of each of the one or more first-server output objects to an identity of the one or more second-server output objects as the one or more first server commands are sequentially executed.

16. The computer program product of claim 9, wherein the first server includes an online server and the second server includes an offline server.

17. The method of claim 1, wherein a first server application executing commands on the original data set and a second server application executing commands on the replicated data set each use different naming schemes.

18. The computer program product of claim 9, wherein a first server application executing commands on the original data set and a second server application executing commands on the replicated data set each use different naming schemes.

* * * * *